(12) United States Patent
Clayton et al.

(10) Patent No.: US 9,939,550 B2
(45) Date of Patent: Apr. 10, 2018

(54) DETECTION OF SPECIAL NUCLEAR MATERIAL AND OTHER CONTRABAND BY PROMPT AND/OR DELAYED SIGNATURES FROM PHOTOFISSION

(71) Applicant: Varex Imaging Corporation, Salt Lake City, UT (US)

(72) Inventors: James Clayton, San Jose, CA (US); Edward J. Seppi, Portola Valley, CA (US)

(73) Assignee: VAREX IMAGING CORPORATION, Salt Lake City, UT (US)

( * ) Notice: Subject to any disclaimer, the term of this patent is extended or adjusted under 35 U.S.C. 154(b) by 611 days.

(21) Appl. No.: 13/834,925

(22) Filed: Mar. 15, 2013

(65) Prior Publication Data

US 2014/0270034 A1    Sep. 18, 2014

(51) Int. Cl.
*G01T 3/00* (2006.01)
*G01V 5/00* (2006.01)

(52) U.S. Cl.
CPC ............ *G01V 5/0091* (2013.01); *G01T 3/005* (2013.01)

(58) Field of Classification Search
CPC .............................. G01V 5/0091; G01T 3/005
USPC .......................................................... 376/154
See application file for complete search history.

(56) References Cited

U.S. PATENT DOCUMENTS

| | | |
|---|---|---|
| 3,636,353 A | 1/1972 | Untermyer |
| 3,767,919 A | 10/1973 | Michaelis |
| 3,786,256 A | 1/1974 | Untermyr |
| 3,796,875 A | 3/1974 | Michaelis |
| 3,832,545 A | 8/1974 | Bartko |
| 4,897,550 A | 1/1990 | Bernard et al. |
| 4,902,467 A | 2/1990 | Schoenig et al. |
| 5,076,993 A | 12/1991 | Sawa et al. |
| 5,098,640 A | 3/1992 | Gozani et al. |
| 5,378,895 A | 1/1995 | Cole et al. |
| 5,606,167 A | 2/1997 | Miller |
| 5,784,424 A | 7/1998 | Fries et al. |
| 5,880,469 A | 3/1999 | Miller |
| RE36,201 E | 4/1999 | Miller |
| 6,144,032 A | 11/2000 | Gazdzinski |
| 6,300,634 B1 | 10/2001 | Gazdzinski |
| 7,142,625 B2 | 11/2006 | Jones et al. |
| 7,277,521 B2 | 10/2007 | Norman et al. |
| 7,313,221 B2 | 12/2007 | Sowerby et al. |
| 7,474,725 B2 | 1/2009 | Norman et al. |

(Continued)

OTHER PUBLICATIONS

Auslender et al., "Triode RF Gun for Linear Electron Accelerators", Proceedings of RuPAC XIX, Dubna, pp. 390-392, 2004.

(Continued)

*Primary Examiner* — Jack W Keith
*Assistant Examiner* — Daniel Wasil
(74) *Attorney, Agent, or Firm* — Brandon N. Sklar; Cozen O'Connor

(57) ABSTRACT

In accordance with embodiments of the invention, at least the potential presence of Special Nuclear Material ("SNM") is determined by the detection of prompt neutrons, prompt gamma rays, delayed neutrons, and/or delayed gamma rays from photofission, via time-of-flight ("TOF") spectroscopic methods. Methods and systems are disclosed.

17 Claims, 4 Drawing Sheets

(56) References Cited

U.S. PATENT DOCUMENTS

| | | | |
|---|---|---|---|
| 7,529,332 B2 | 5/2009 | Norman et al. | |
| 2004/0258189 A1 | 12/2004 | Norman et al. | |
| 2005/0220247 A1* | 10/2005 | Ruddy et al. | 376/159 |
| 2010/0046690 A1* | 2/2010 | Proctor et al. | 376/154 |
| 2012/0155592 A1* | 6/2012 | Gozani et al. | 376/154 |

OTHER PUBLICATIONS

Bryan et al., "Fast Neutron—Gamma Pulse Shape Discrimination of Liquid Scintillation Signals for Time Correlated Measurements", IEEE pp. 1192-1195, 2004.

Hell et al., "The Evolution of Scintillating Medical Detectors", Nuclear Instruments and Methods in Physics Research, Elsevier Science B.V., pp. 40-48, 2000.

Holder et al., "Cobald—An Inverse Compton Back-Scattering Source at Daresbury", Sychrotron Light Sources and FELs, Proceedings of EPAC08, pp. 160-162, 2008.

Jain et al., "Design and Operating Experience of Triode Electron Guns for Industrial Electron Accelerators", Raja Ramanna Centre for Advanced Technology (RRCAT), pp. 348-350, 2007.

Jones et al., "Pulsed Photon Interrogation with Neutron-Induced Gamma-Ray Spectrometry for Cargo Inspections", SPIE vol. 2276, Cargo Inspection Technologies, pp. 326-338, 1994.

Khodak et al., "Electron Gun for Technological Linear Accelerator", National Science Center "Kharkov Institute of Physics and Technology", "Accelerator" R&D Production Establishment, pp. 86-88, 2000.

Leemans, et al., "GeV Electron Beams from a CM-Scale Accelerator", Lawrence Berkeley National Laboratory, pp. 1-12, May 4, 2006.

Leemans, et al., "Laser Guiding for GeV Laser-Plasma Accelerators", The Royal Society, pp. 585-600, 2006.

Leo, William R., "Techniques for Nuclear and Particle Physics Experiments: A How-to Approach", Springer-Verlag, pp. 157-176, 1987.

Malka et al., "Medical Applications with Electron Beam Generated by Laser Plasma Accelerators", Commercial and Biomedical Applications of Ultrafast Lasers VIII, SPIE Digital Library, 5 pages, 2008.

Malka et al., "Principles and Applications of Compact Laser-Plasma Accelerators", Nature Publishing Group, Nature Physics, vol. 4, pp. 447-453, Jun. 2008.

Moran, M. J., "Gamma-Ray Diagnostics of D-T Fusion Reactions", Lawrence National Laboratory, Proceedings of the $5^{th}$ Topical Conference on High Temperature Plasma Diagnostics, pp. 1-9, Sep. 1984.

Norman, et al., "Time-Dependent Delayed Signatures from Energetic Photon Interrogations", Elsevier B.V., Science Direct, Nuclear Instruments and Methods in Physics Research, pp. 316-320, May 8, 2007.

Pozzi et al., "Analysis of Neutron and Photon Detection Position for the Calibration of Plastic (BC-420) and Liquid (BC-501) Scintillators", Oak Ridge National Laboratory, Engineering Science and Technology Division, ORNL, Nuclear Science and Technology Division, pp. 1-15, Jun. 2003.

Saint-Gobain "Material Safety Data Sheet", 4 pages, Jan. 22, 2003.

Saint-Gobain Ceramics & Plastics, Inc., "BC-418, BC-420, BC-422 Premium Plastic Scintillators", 2 pages, 2005-2008.

Shimada et al., "Inverse Compton Scattering of Coherent Synchrotron Radiation in an Energy Recovery Linac", The American Physical Society, 5 pages, Oct. 14, 2010.

Barnes et al., "Report of the Basic Energy Sciences Workshop on Compact Light Sources", Basic Energy Sciences Workshop, pp. 1-59, May 11-12, 2010.

\* cited by examiner

DETECTION OF SPECIAL NUCLEAR MATERIAL AND OTHER CONTRABAND BY PROMPT AND/OR DELAYED SIGNATURES FROM PHOTOFISSION

FIELD OF THE INVENTION

Radiation scanning of objects and, more particularly, radiation scanning of objects for Special Nuclear Material and other contraband based on the detection of prompt and/or delayed gamma rays and neutrons.

BACKGROUND OF THE INVENTION

High energy (MeV) X-ray radiation is used to scan cargo containers and air shipments for contraband, verification of manifests for customs, and duty collection. The items of concern may depend on the individual customs agencies for a country, or individual ports. X-ray radiation may be used to non-intrusively examine cargo containers and other objects for illegal drugs, weapons, explosives, chemical agents, and/or biological agents. Radioactive, fissionable, fissile, and fertile materials, including Special Nuclear Material ("SNM") that may be used to manufacture atomic devices, including dirty bombs, may also be smuggled in such objects.

Fissile materials, such as uranium-235, uranium-233, and plutonium-239, may undergo fission by the capture of a photon or slow (thermal) neutron of sufficient energy. Photon-induced fission is referred to as photofission. Fission may also be induced by lower energy photons and neutrons by barrier penetration at a lower rate than photofission.

Fissionable materials include fissile materials, and materials that may undergo fission by capture of fast neutrons, such as uranium-238. Fertile materials may be converted into fissile materials by the capture of a slow (thermal) neutron. For example, uranium-238 may be converted into plutonium-239, and thorium-232 may be converted into uranium-233. Fissionable, fissile, and fertile materials are referred to herein as "nuclear material."

Special Nuclear Material ("SNMs"), which more readily undergo fission than other fissile materials, are defined by the U.S. Nuclear Regulatory Commission to include plutonium, uranium-233, and uranium enriched in the isotopes of uranium-233 or -235. Radioactive materials, certain of which may have lower atomic numbers than nuclear materials (cobalt-60, for example, has an atomic number of 27), are typically shielded by high atomic number materials, such as lead (Z=82), tungsten (Z=74), and molybdenum (Z=42).

SNM may undergo fission by absorbing a photon having energy above a fission threshold of the particular SNM. SNM have fission thresholds of about 5.8 to 6.0 MeV. Photofission releases about 200 MeV of energy in the form of high energy neutrons, gamma rays, excited fission fragments, and kinetic energy transferred to fission fragments. The high energy neutrons and gamma rays are referred to herein as "prompt neutrons" and "prompt gamma rays," respectively, because they are released very soon (on the order of $10^{-15}$ to $10^{-12}$ seconds) after fission. On average, 6 to 7 prompt gamma ray photons and 2 to 3 prompt neutrons are generated in each photofission event, depending on the SNM present. For example, on average, 2.4 neutrons are emitted per fission of uranium-235, while on average 2.9 neutrons are released per fission of plutonium-239. Almost all of the fission fragments are neutron rich and decay toward a stable valley via beta decay to produce delayed gamma rays and delayed neutrons, depending on the fission fragments. These beta decays happen microseconds to hundreds of milliseconds after emission of the prompt gamma rays and neutrons. The emission rate of prompt neutrons and prompt gamma rays is about 100 times greater than the emission rate of delayed neutrons. The emission rate of delayed gamma rays is at least 10 times greater than the emission rate of delayed neutrons. While gamma rays are emitted from almost all of the nuclei subject to fission, not every nucleus will emit a beta delayed neutron. A small amount of fission may be induced by photons having energies below the fission threshold, by barrier penetration. The detection of nuclear material based, at least on part, on the detection of delayed neutrons, is discussed in U.S. Pat. No. 7,423,273, which is assigned to the assignee of the present invention and is incorporated by reference herein.

Neutron detectors, to detect both prompt and delayed neutrons, typically comprise three (3) helium-filled tubes surrounded by a hydrogenous material, such as polyethylene. The hydrogenous material is covered with a layer of cadmium (Cd), which has a large capture cross-section for thermal neutrons (2500 barns). The cadmium absorbs background thermal neutrons resulting from thermalized photoneutron events, preventing their passage to and detection by the helium tubes. Other neutron detection methods are known in the art, including scintillators and silicon carbide (SiC) detectors, for example.

Gamma rays have been collected by scintillator based detectors, such as sodium iodide doped with thallium (NaI (Tl)), barium germanium oxide (BGO), high purity germanium (HPGe), germanium lithium (GeLi), and plastic scintillators. Inorganic scintillators have better efficiency than organic scintillators but may be too expensive for large solid angle arrays required when examining large objects such as cargo containers.

SUMMARY OF THE INVENTION

In accordance with embodiments of the invention, at least the potential presence of Special Nuclear Material ("SNM") is determined by the detection of prompt neutrons, prompt gamma rays, delayed neutrons, and/or delayed gamma rays from photofission, via time-of-flight ("TOF") spectroscopic methods. The use of one or more TOF spectra enables separate detection of any or all of these photofission by-products, while decreasing the detection of background radiation that could interfere with proper identification of the by-products. In certain embodiments of the invention, the collection of prompt and/or delayed gamma rays, and/or prompt and/or delayed neutrons enables identification of the SNM present, as well as the presence of conventional explosives, chemical agents, and drugs, based on the unique signatures (energies) of emissions from respective excited nuclei of particular elements. The TOF data may also enable localization of materials in the container. The multiple modes of examination make it more difficult to shield SNMs, conventional explosives, chemical agents, and drugs, for example, from detection.

If it is desired to detect prompt and/or delayed neutrons, then the radiation pulses need to be separated by sufficient time to allow the lowest energy neutron of interest to reach and be detected by a detector, before a new pulse causes generation of new fission by-products. The X-ray source is pulsed to generate pulses of X-ray radiation separated by sufficient time to allow the slowest neutrons resulting from a first pulse to be detected prior to emission of the next pulse.

In accordance with one embodiment of the invention, prompt gamma rays and prompt neutrons are detected. The prompt gamma rays and prompt neutrons may be detected after scanning by the pulse of radiation that causes generation of the prompt gamma rays and neutrons. For the example, the prompt gamma rays and neutrons may be detected in time periods between consecutive pulses of radiation. Here, first and second radiation pulses are "consecutive radiation pulses" if no radiation pulses are provided between the first and second radiation pulses.

In accordance with another embodiment of the invention, delayed gamma rays and delayed neutrons are detected after scanning by the pulse of radiation that causes generation of the delayed gamma rays and neutrons, in time periods between consecutive pulses of radiation. In one example, each pulse of radiation causing generation of the delayed gamma rays and neutrons is a macropulse comprising a plurality of micropulses of radiation. In this case, prompt gamma rays and prompt neutrons may be detected between consecutive micropulses of radiation during a macropulse, while delayed gamma rays and delayed neutrons may be detected between consecutive macropulses. Consecutive macropulses are consecutive groups of radiation pulses separated by greater time periods than the time periods between the micropulses within a respective macropulse. In a compact system, where radiation source and the object being examined are up to about 20 meters apart, each macropulse may be from about 3 microseconds to about 10 microseconds long, and each micropulse may be from about 0.5 nanosecond to about 10 nanoseconds long, for example. The time between micropulses may be from about 100 nanoseconds to about 300 nanoseconds, for example. The exact time periods are determined, in part, by the size of the scanning unit, including the distances from the radiation source to the object, the thickness of the object, and the distance from the object to detectors provided to detect the respective fission by-products and the expected time of detection of the various fission by-products.

In accordance with another embodiment of the invention, the at least potential presence of SNMs, as well as explosives, drugs, and certain chemical and biological agents, may be determined by scanning with both X-ray radiation and neutrons.

DETAILED DESCRIPTION OF PREFERRED EMBODIMENTS

Detectors are gated between a high voltage, detection state and a low voltage, quiescent state based on a time of flight ("TOF") spectrum of a radiation source and/or expected emissions of different photofission products, such as prompt gamma rays, delayed gamma rays, prompt neutrons, and/or delayed neutrons, to eliminate the interfering photon background. The TOF spectrum takes into consideration the expected detector arrival times of the photofission products of interest, based on the emission times and the speed of the emitted products through air and the container being examined. The TOF spectrum may take into consideration one or more of the following: prompt gamma rays (photons) and prompt neutrons arrive at detectors before delayed gamma rays and delayed neutrons, photons are faster than prompt neutrons, and neutron speed may vary based on the kinetic energy from the fission reaction. Use of the TOF spectrum may also help avoid the detection of background particles such as cosmic muons and natural radiation from background sources, while detecting the photofission by-products of interest.

Figure 1:
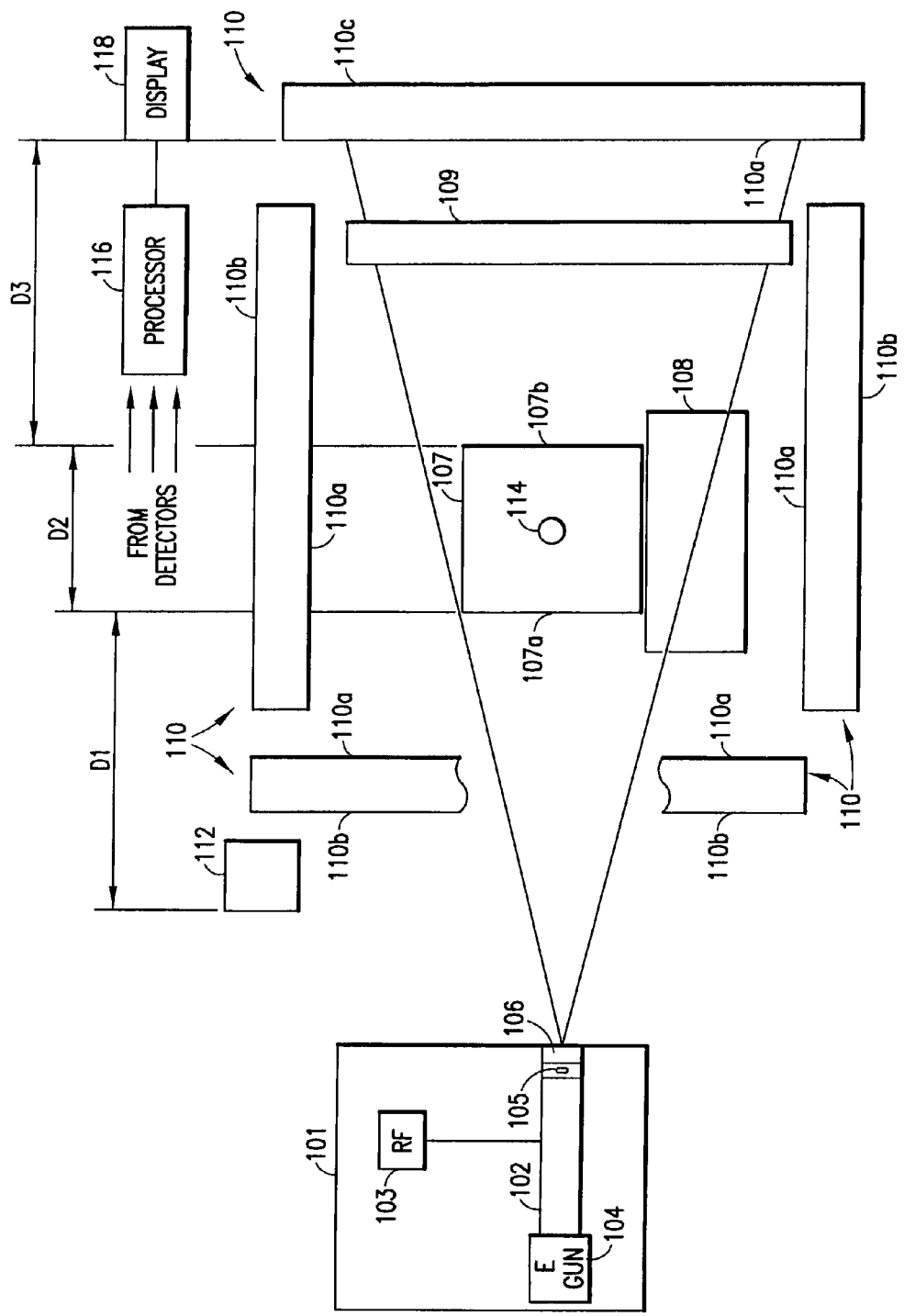
FIG. 1 is a schematic diagram of an example of an X-ray scanning system in accordance with an embodiment of the invention.

FIG. 1 is a schematic diagram of an example of a radiation scanning system 100 in accordance with one embodiment of the invention. The radiation scanning system comprises a radiation source 101. In this embodiment the radiation scanning system 100 is an X-ray scanning system 100 comprising an X-ray source 101. The X-ray source 101 comprises an accelerator 102 comprising one or more accelerating chambers (not shown) driven by an RF source 103, such as a magnetron or a klystron. A charged particle source 104 injects charged particles into the accelerating chambers of the linear accelerator 102. The charged particles may be injected as pulses of charged particles. The charged particles may be electrons and the charged particle source 104 may be an electron gun, for example. In another embodiment of the invention, the X-ray source 101 is replaced by a combined X-ray source/neutron source 200, as discussed further below with respect to FIG. 5. The source 101 may also be replaced by only a source of neutrons in FIG. 1, as well. In that case, the source could comprise a cyclotron or DC accelerator, for example.

Charged particles injected into the accelerating chambers while RF power is provided to the accelerating chambers are accelerated. The accelerated charged particles impact a target 105 to generate X-ray radiation by the Bremsstrahlung effect. A collimator 107 collimates the generated radiation into a radiation beam directed toward an object 107 to be inspected, such as a cargo container. The collimator 107 may collimate the radiation into a pencil beam, fan beam, or cone beam, for example. The collimator 107 may be an adjustable collimator, such as a multi-leaf collimator, so that the height and/or width of the beam may be adjusted, as discussed further below.

A conveying system 108 supports and moves the cargo container 108 or other object to be inspected through the system 100. The cargo container 108 may be moved continuously through the system or in steps, for example. Scanning may take place while the cargo container is being moved through the system or in between steps. The cargo container 108 may be rotated while being scanned, as well. In that case the conveying system would convey the cargo container to and from a rotatable platform, for example.

In the example of FIG. 1, a plurality of detectors 109, 110, 112 are provided around the cargo container 107. The first detector 109 is a spatial, integrating detector positioned behind the cargo container 107 to detect X-ray radiation transmitted through the cargo container. The first detector 109 may be a photon detector, such as photodiodes comprising inorganic scintillators, as is known in the art. Cadmium tungstate ($CdWO_4$) scintillators may be used, for example. Amorphous silicon (aSi) detectors, such as PaxScan™ detectors available from Varian Medical Systems, Inc., Palo Alto, Calif., may also be used, for example. The spatial detectors may be in the form of modules assembled into one or more detector arrays. The first spatial detector 109 is optional.

The second detectors 110 are neutron detectors to detect prompt and/or delayed neutrons. The neutron detectors 110 are provided at least partially around the cargo container 107. Since neutrons may be emitted in any direction, the neutron detectors 110 may be positioned completely around (4π solid angle) the cargo container 107. The detectors may be large solid angle detectors, enabling a large amount of the 4π solid angle around the container 107 to be covered. The detectors 110 may be in the form of modules assembled into one or more detector arrays. The detectors 110 may be positioned the same distance from the center of the object 107 around a curve, to the extent possible. The neutron detectors 110 may be supported by a shell-like structure (not shown), centered around the cargo container 107, as is known in the art. The shell-like structure may be spherical or nearly spherical, for example. One or more additional layers (not shown) of neutron detectors may be provided, if desired, to detect neutrons not detected by the detector 110. Subsets of detectors with different resolutions may be provided as well. This may enable larger solid angle coverage with lower electronics costs.

Each neutron detector module 110 may comprise cylindrical proportional counters filled with $^3$He, for example. The counters may be surrounded by polyethylene, which may be coated with a layer of cadmium (Cd), for example, to absorb thermal neutrons ("slow" neutrons). Fast neutrons are thermalized in the polyethylene layer before being detected in the $^3$He detectors. Only prompt and delayed neutrons are therefore detected in the $^3$He detectors. Suitable neutron detectors are commercially available from Canberra Industries, Meriden, Conn., for example. If additional layers of neutron detectors are provided, they may have the same or different configurations than that of the neutron detectors 110.

Alternatively, the second, neutron detectors 110 may comprise semiconducting material, such as organic liquid or plastic scintillators. The scintillators may comprise sodium iodide (NaI), thallium (Tl), boron germanium oxide ("BGO"), high purity germanium (HPGe), or germanium lithide (GeLi), for example. Scintillator materials that allow pulse shape discrimination, such as gadolinium (Gd), barium fluoride, or fast/slow scintillators may be used to further differentiate between the detected photons and neutrons based on the differing light output caused by the detection of photons and the detection of neutrons by the scintillator, the delayed signal as is known in the art. Fast/slow scintillators may be used to further differentiate between the detected photons and neutrons based on thermalization of fast neutrons and final absorption, as is known in the art. Suitable detectors are available from Saint-Gobain Crystals, Hiram, Ohio, and Eljen Technology, Sweetwater, Tex., for example.

A fourth, gamma ray detector 112 is also provided to detect prompt gamma rays that would be generated by an SNM 114 within the cargo container 107 from photofission. Prompt gamma rays generated by the SNM 114 are emitted in all directions. Gamma ray detectors 112 may therefore be provided completely around the cargo container 107, supported by another three-dimensional arcuate or spherical frame between the radiation source 101 and the cargo container 107. Due to its proximity to the radiation source 102, the gamma ray detectors 112 may need to be well-shielded to mitigate the detection of X-ray radiation emitted by the source 101. Appropriate shielding techniques are known in the art. The gamma ray detectors 112 may comprise organic, organic liquid, or inorganic scintillators. The scintillators may comprise sodium iodide (NaI), thallium (Tl), bismuth germanate oxide ("BGO"), high purity germanium (HPGe), or germanium plastic scintillator, for example. An alternative gamma ray detector, that can also detect neutrons, is discussed below. As above, the gamma ray detector 112 may be a detector array assembled from modules.

It may be difficult to differentiate gamma rays detected by a detector behind the cargo container 107 in the transmission geometry from X-ray photons transmitted through the container, because the gamma rays and transmitted photons both arrive at about the same time and there are typically many more photons from the X-ray source 101 and the container 107 than gamma rays generated from photofission. Gamma rays emitted in a direction back towards the X-ray source 101 are easier to detect and differentiate from X-ray photons because there are fewer back scattered photons than transmitted photons. In addition, X-ray photons from the source that are reflected via Compton scattering will be down shifted in energy to the range of 250-450 KeV, which can be filtered out by radiation shielding. The arcuate frame supporting the gamma ray detectors 112 may therefore be a semi-circular frame (not shown) between the radiation source 101 and the cargo container 107. The semi-circular frame may be centered about the cargo container 107. The radius of the semi-circular frame may be greater than or less than the radius of the shell-like structure supporting the neutron detectors. The gamma ray detector 112 and the neutron detectors 110 may be supported by the same frame.

The detectors 109, 110, 112 are coupled to a processor 116, such as a microprocessor or computer, through suitable analog-to-digital processing circuitry. The coupling may be electrical, via wires, or electromagnetic, via optical fiber. The detectors 109, 110, 112 may be wirelessly coupled to the processor 116 as well. The computer is coupled to a display 118. The processor 116 or another processor, which may be a programmable logic controller, controls operation of the radiation source 101, as well. A master clock (not shown) is provided to provide timing for the operations of the various components of the scanning system 100, as described further below.

During X-ray scanning of a container 107, some of the X-ray photons will be absorbed by the contents of the cargo container 107 and some will be transmitted and scattered through the container. The detector 109 detects the transmitted X-ray photons, enabling determination of attenuation of the X-ray beam and generation of an X-ray image for analysis. Attenuation is indicative of the densities of the materials within the cargo container 107 traversed by the X-ray radiation beam, as a known in the art.

If an SNM 114 is present in the cargo container 107, some X-ray photons may be absorbed by the SNM, causing photofission. As discussed above, photofission results in the emission of prompt neutrons and prompt gamma rays by the nuclei of the SNM, followed by delayed neutrons and delayed gamma rays from decay of excited fission fragments. Subsequent pulses of X-ray photons generated by the X-ray source 102 will be transmitted through the cargo container 107, or will be absorbed by the SNM 114, causing a new chain of photofission emissions.

Obtaining useful information from the X-ray photons, prompt neutrons, prompt gamma rays, delayed neutrons, and/or delayed gamma rays concerning the contents of the cargo container 107 may be difficult because of the multiple repeating events happening in overlapping time periods. For example, delayed gamma rays or delayed neutrons resulting from a first pulse of X-ray radiation may arrive at the detectors at the same time as or after prompt gamma rays and prompt neutrons resulting from a subsequent pulse. Background radiation from the radiation source and other sources may also be detected, interfering with the test results. For example, even when well shielded, the detectors 112 may detect photons emitted from the radiation source 101 directly or reflected from the cargo container 107 and its contents. Muons from cosmic rays may also be detected.

In order for the detectors 110 to detect prompt neutrons caused by a first photofission event instead of subsequently generated photons from subsequent photofission events, for example, in accordance with an embodiment of the invention, time of flight ("TOF") spectra are used to control when the detectors 110, 112 are gated to a high voltage for detection, based on the expected times when particular events are expected to occur, and gated to a low voltage to prevent detection of background signals that could interfere with the detection of the desired events. In addition, in accordance with embodiments of the invention, the generation of radiation pulses may be controlled to allow for the detection of photofission by-products of interest, between radiation pulses.

Photons travel at the speed of light through air of $2.998 \times 10^8$ meters per second (about 0.3 meters per nanosecond ("ns")). Photons travel through typical inorganic and organic material in a cargo container 107 at about the same speed. In one example, if the X-ray source 102 is a distance D1 of 10 feet (3.3 meters) from the face 107a of the cargo container 107 in FIG. 1, it would take an X-ray photon about 10 ns to reach the face. It would take an X-ray photon about 5 ns to travel through a cargo container 107 having a width D2 of 1.5 meters (4.9 feet). If the distance D3 from the rear face 107b of the cargo container 107 to the face of the detector 109 is also about 10 feet (3.3 meters), it would take about 10 ns to travel from the rear face 107b of the cargo container 107 to the detector 110. It would therefore take about 25 ns for an X-ray photon to travel from the X-ray source 102 through the cargo container 107 to the detectors 110. As mentioned above, X-ray photons and prompt gamma rays will arrive at the gamma ray detectors 112 at about the same time.

Neutrons resulting from photofission travel at a much slower speed than X-ray photons, prompt gamma rays, and delayed gamma rays arising from excited nuclei that decay after the fission event has occurred. The speed of the neutrons depends on the material being traversed and the energy of respective resulting neutrons. It would take about 150 ns to about 250 ns for the slowest prompt neutrons emitted by SNM within the cargo container 107 to travel the 10 feet (3.3 meters) from the rear face 107b cargo container 107 to the detector 110, through air. It would take about 100 ns for prompt neutrons to travel across a cargo container 107 having a width of 1.5 meters (4.9 feet). If all the detectors 110a and all the detectors 110b are the same distance D3 from the center of the cargo container 107, then the travel times of the neutrons to the detectors will be the same. It would therefore take about 210 ns for such a neutron to be detected by one of the detectors 110a, after emission by the X-ray source 102 of the X-ray photon causing generation of that neutron.

To facilitate detection of prompt gamma rays and prompt neutrons without detecting X-ray photons from a current or subsequent X-ray pulse, in one embodiment of the invention, the radiation source 101 is configured to generate pulses of radiation separated by sufficient time for any prompt gamma rays and prompt neutrons emitted by the SNM 114 to reach the gamma ray detector 112 and the neutron detectors 110a, 110b, respectively, based on TOF spectra. This is accomplished in one example by suitably controlling the injection of the electron pulses provided by the electron gun 104 and suitably controlling the injection of the RF drive pulses provided by the RF source 103 to the accelerator 102 so that a second electron pulse is not injected until after the expected arrival time of the prompt gamma rays and/or prompt neutrons that would result from a radiation pulse generated from the impact of a first, prior electron pulse.

During a pulse of RF power, the charged particle source 104, here an electron gun, fires one or more times to inject one or more pulses of charged particles, here electrons, into the accelerator 102, thereby generating one or more pulses of X-ray photons during each RF pulse.

In one example, in the X-ray scanning system 100 having the dimensions described above, a series of consecutive X-ray radiation pulses of from about 0.5 ns to about 10 ns wide, separated by from about 150 ns to about 250 ns, are generated by the X-ray source 101, during a single pulse of RF power. From 1 to about 50 pulses of charged particles may be injected into the linear accelerator 102 during an RF pulse, for example. Twenty (20) pulses may be injected to generate 20 radiation pulses during an RF pulse, for example. To provide sufficient time between radiation pulses to detect the prompt gamma rays and prompt neutrons, before the arrival of X-ray photons from the radiation source 102 in a subsequent X-ray pulse, in this example, each RF pulse provided by the RF source 105 is from about 4 microseconds to about 5 microseconds long. If 5 microseconds long, for example, twenty electron pulses, each pulse being one nanosecond long, may be injected during the RF pulse, resulting in twenty pulses of X-ray radiation, each one nanosecond long. In this example, each nanosecond pulse of X-ray radiation is separated by 250 nanoseconds. Prompt gamma rays and prompt neutrons may be detected in the periods between consecutive radiation pulses. First and second charged particles are "consecutive pulses" if no charged particle pulses are provided between the first and second charged particle pulses.

Other time periods for electron injection and RF pulse injection may be provided. If the distances between the radiation source 102, the object 107 being scanned, and the detectors 109, 110, 112 are different than that described above, other time periods may be required, which can be determined by one skilled in the art based on the teachings herein. In a standoff system, where the detectors may be 100 meters away from the object being scanned, for example, consecutive radiation pulses may be separated by from about 230 nanoseconds to about 350 microseconds, for example.

If delayed gamma rays and/or delayed neutrons are also to be detected, the RF pulses may be provided to the accelerator 102 from about 1 to about 4 milliseconds apart, to enable detection of these photofission by-products between consecutive RF pulses, as discussed further, below. If not, each RF pulse need only be far enough apart to allow system components, such as the pulse forming network (not shown) in the RF power supply, to recharge.

In addition, to facilitate the detection of prompt gamma rays by the gamma ray detector 112 and to decrease detection of X-ray photons that could interfere with the detection of the gamma rays, the gamma ray detector 112 is gated to a high gain to detect gamma rays in between consecutive X-ray radiation pulses. The gamma ray detection 112 is gated low during and for a time after each X-ray pulse. The gamma ray detector arrays 112 are not, therefore, sensitive to the X-ray photons emitted by the X-ray source 101 and the scattered/leakage X-ray photons. Instead of gating the gamma ray detector 112 to a high gain in between consecutive X-ray pulses, the detector may be sampled between pulses by the processor 116, for example.

Figure 2:
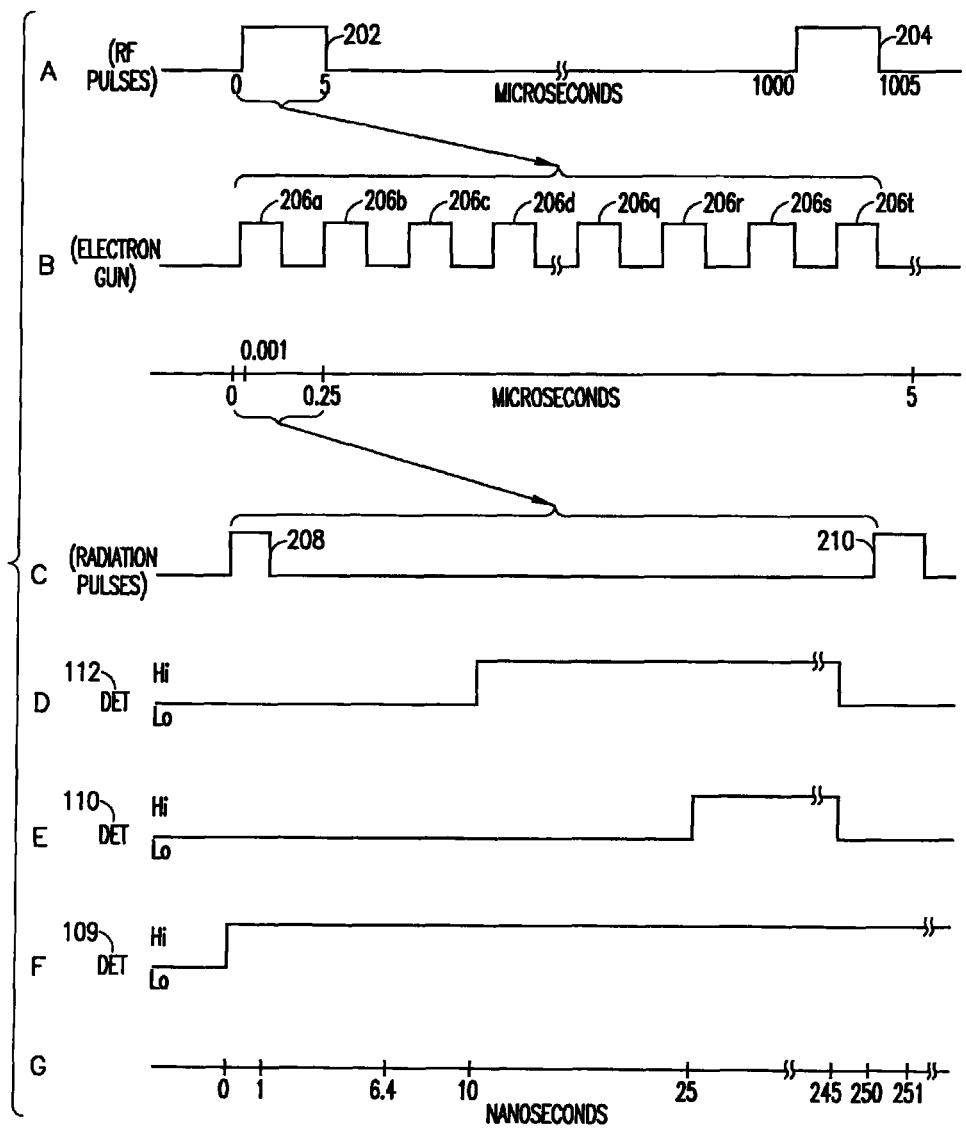
FIG. 2 is an example of a timing diagram for the operation of various components of the scanning system of FIG. 1 in accordance with this embodiment of the invention.

FIG. 2 is an example of a timing diagram for operation of various components of the scanning system 100 in accordance with this embodiment of the invention. The detection of prompt gamma rays and prompt neutrons takes place between adjacent radiation pulses.

FIG. 2, Line A, shows two consecutive RF pulses 202, 204 injected by the microwave power source 102a into the linear accelerator 102. The first RF pulse 202 is emitted starting at time zero (0) and has a length of 5 microseconds. The second 5 microsecond pulse 204 is emitted at 1,000 microseconds in this example and also has a length of 5 microseconds. Subsequent RF pulses may be emitted every 1,000 microseconds for 5 microseconds, or at other times and for different lengths of time.

FIG. 2, Line B shows the injection of a plurality of pulses 206 of charged particles into the accelerator 101 by the electron gun 102b, during the time period of the first 5 microsecond RF pulse 202 of Line A. Twenty (20) consecutive charged particle pulses 206a-206t may be provided, for example, each having the same length, during the RF pulse 204 shown in Line A, as well as during subsequent RF pulses. Each charged particle pulse may have a length of about 0.001 microseconds and a new pulse may be injected every 0.25 microseconds, for example. Only charged particle pulses 206a to 206d and 206p to 206t are shown for ease of illustration. In other examples, different numbers of charged particle pulses may be provided having different lengths and/or at different rates.

FIG. 2, Line C shows two radiation pulses 208, 210 emitted by the X-ray source 101 in response to the first two pulses 206a, 206b of charged particles in Line B. The first radiation pulse 206 is emitted starting at time 0 and lasts for 1 ns (0.001 microseconds). The second radiation pulse is emitted at 250 ns (0.250 to 16 microseconds) and lasts until 251 ns (0.251 microseconds). If twenty (20) charged particle pulses 206a-206t are emitted in 5 microseconds, then 20 radiation pulses would be emitted in the same 5 microsecond period. It is noted that the nanosecond ("ns") time scale of Line C is shown in Line G of FIG. 2 and is different than the microsecond time scale of Line B. Also, the microsecond time scales of Lines A and B are different from each other.

FIG. 2, Lines D-F show examples of timing diagrams for the detectors 112, 110 and 109, respectively, with respect to the nanosecond time scale of FIG. 2, Line G, between the successive radiation pulses 208, 210. The detector arrays 112, 110, 109 can be gated to a high (Hi) gain for detection and a low (Lo) gain in a quiescent state during which no detection can take place.

FIG. 2, Line D is an example of a timing diagram for the gamma ray detector 112, between the two radiation pulses of FIG. 2, Line C. To avoid the detection of X-ray photons from the radiation source 102 directly, and after reflection by the cargo container, the gamma ray detector 112 is not gated to a high gain setting until after an X-ray pulse 208 is emitted and after X-ray photons from the contents of the cargo container 107 are expected to have been received. In this example, where the front face 107a of the cargo container is 10 meters from the radiation source 102, the cargo container is 5 feet (1.5 meters) wide, and the detector array 112 is 0.5 meters from the rear face 107b of the cargo container, X-ray photons reflected from the center of the cargo container would be received by a detector 112 about 6.4 ns after emission of the X-ray pulse from the X-ray source 101 (time to travel 10 meters to face of cargo container, 3.3 ns; time to travel from to center of cargo container back to face 107a, 2.6 ns; time from face 107a to detector array 110 after exiting cargo container, 0.5 ns). The detector array 112 is therefore gated to the high gain at a time after 6.4 ns. In this example, the detector array 112 is gated to the high gain 10 ns after the start of the X-ray pulse. The detector 112 may be gated to the high gain at other times after 6.4 nanoseconds, instead.

The gamma ray detector 112 is kept at the high gain to detect gamma rays until just prior to the emission of the next X-ray pulse, such as until about 5 ns before the second X-ray pulse 210 is generated at 250 ns (245 ns after emission of the first pulse). It is then gated to the low gain to be in the low, quiescent state prior to the start of the next X-ray pulse 210 to avoid detection of stray photons from the radiation source 102 after emission of the radiation pulse. It may be gated to the low gain 5 to 10 ns prior to the next X-ray pulse, for example.

FIG. 2, Line E shows operation of the neutron detectors 110, between the first two radiation pulses 208, 210 shown in FIG. 2, Line C. If the peak radiation energy is 20 MeV, and the distance from the center of the cargo container 107 is 3.0 meters, for example, prompt neutrons are expected to arrive at the neutron detectors 110 starting at about 40 nanoseconds. The detectors 110 are therefore gated to the high voltage prior to that time, at 25 ns, for example, to ensure detection of the prompt neutrons. They are also turned off before the next X-ray pulse, such as at 245 ns, in this example.

FIG. 2, Line F is an example of a timing diagram of the operation of the detector 109, which detects photons transmitted through the cargo container 107. The spatial detector 109 is always gated to the high gain to detect transmitted photons. It is not necessary to gate the spatial detector 109 to a low gain but that is an option.

The detectors 110, 112 are similarly gated high and gated low with respect to the remaining pulses 206c-206t and the corresponding radiation pulses during the 5 microsecond RF pulse 202, and the same pattern may be repeated during the second RF pulse 204 and subsequent RF pulses.

The detection of prompt gamma rays by the detector array 112 or prompt neutrons by the detector arrays 110a, 110b is suggestive of the presence of SNM. The coincident detection of both prompt gamma rays and prompt neutrons confirms the presence of SNM, when the radiation energy has a peak value in the range of from about 6 MeV to about 18 MeV. To further confirm that an SNM is present, the presence of delayed gamma rays and/or delayed neutrons may be detected.

Delayed gamma rays are emitted from about 25 microseconds to about 1,000 microseconds after absorbing an X-ray photon. Delayed neutrons are emitted from about 10 microseconds to about 1,000 microseconds after absorbing an X-ray photon. RF pulses and charged particle injection may also be separated by sufficient time to allow for detection of delayed gamma rays and delayed neutrons, in accordance with another embodiment of the invention. The radiation generated during the RF pulse 202, for example, comprises the plurality of radiation pulses corresponding to the charged particle pulses 206a-206t in FIG. 2, lines B, and is referred to as a "macropulse." Similarly, the plurality of charged particle pulses injected during each RF pulse is referred to as a charged particle or electron "macropulse," or "macropulse."

Figure 3:
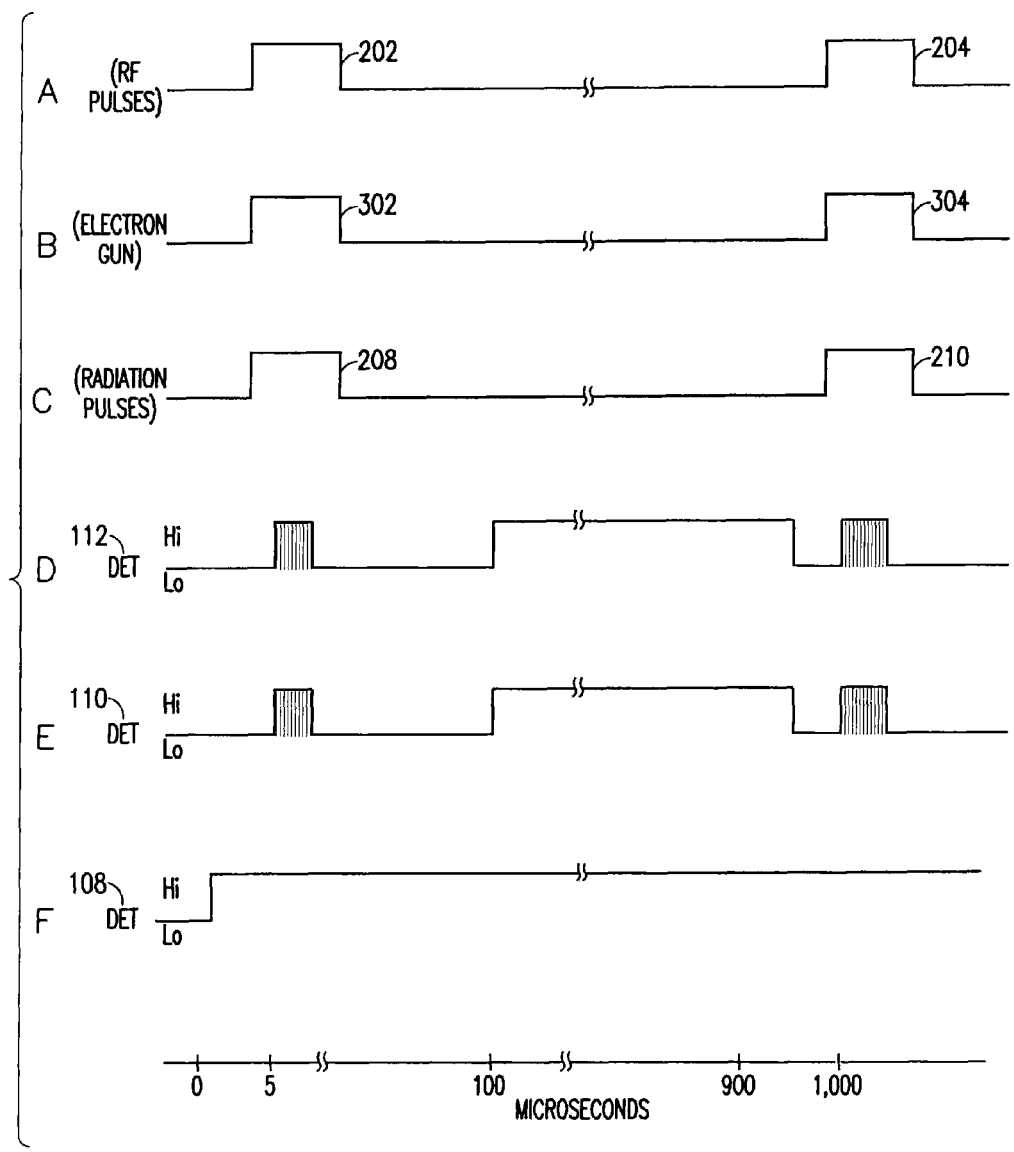
FIG. 3 is an example of a timing diagram for components of the X-ray system, to detect delayed gamma rays and delayed neutrons.

FIG. 3 is an example of a timing diagram for components of the X-ray system 100, to detect delayed gamma rays and delayed neutrons. The timeline of FIG. 3, Line G, which shows a microsecond scale, applies to all of the timelines A-F. Detection of delayed gamma rays and delayed neutrons takes place between the RF pulses and resulting plurality of corresponding X-ray macropulses. The plurality of X-ray pulses resulting from each RF pulse is referred to as a radiation macropulse or macropulse.

FIG. 3, Line A shows the first and second RF pulses 202, 204 of FIG. 2, Line A, emitted starting at times 0 and at 1000 microseconds and provided to the accelerator 102. FIG. 3, Line B, shows two charged particle macropulses 302, 304 injected into the accelerator 102 at the same times as the RF pulses 202, 204. FIG. 3, Line C shows two radiation macropulses 208, 210 resulting from the RF pulses 202, 204 and charged particles macropulses 302, 304 of FIG. 3, Lines A and B, starting at times 0 and 1,000 microseconds. In this example, each charged particle macropulse and each radiation macropulse comprises twenty (20) charged particle pulses and twenty (20) radiation pulses, respectively. In other examples, each macropulse may comprise a different number of charged particle and radiation pulses.

FIG. 3, Lines D, E, and F are examples of timelines for the operation of the gamma ray detector arrays 112, the neutron detector arrays 110, and the spatial detector array 108, respectively. As mentioned above, the spatial detector array 108 may be on all the time, as shown in Line F.

FIG. 3, Lines D and E show the detector arrays 112, 110 gated high during a portion of the radiation macropulses 208, 210. The multiple, closely spaced lines indicate the multiple on/off cycles of the detectors in this time period, a portion of which is shown in FIG. 2. In this embodiment both detector arrays 112, 110 are also gated high between the radiation macropulses 208, 210, to detect delayed gamma rays and delayed neutrons, respectively. In this example, both detector arrays 112, 110 are gated high starting at 100 microseconds, but other start times may be selected between the X-ray radiation macropulses pulses 208, 210. The detectors 110, 112 are switched to the low gain just prior to the start of the second X-ray/radiation macropulse 210, such as at 900 microseconds, for example.

If delayed gamma rays and delayed neutrons are not to be detected, the RF pulses may be closer together. In this case, the RF pulses need only be separated by enough time for the system 100 to recharge. If the radiation source 101 is a DC accelerator, the nanosecond pulses may be provided continuously.

The accelerator of the X-ray source 101 may be a linear accelerator 102. An S-band, 3 GHz linear accelerator, for example, such as an M9, K9, or K15 linear accelerator available from Varian Medical Systems, Inc., Palo Alto, Calif., may be used, for example. The Varian linear accelerators output at least 360 pulses per second. They may be configured to generate the radiation pulses at a frequency of from about 200 to 1,000 times per second (Hertz), by suitable selection and control of the RF source 103 and the electron gun 104.

Other types of accelerators may be used, as well. For example, the accelerator may be a DC accelerator, as mentioned above.

A monochromatic X-ray source employing inverse Compton scattering of a laser beam from a high energy (MeV) accelerator may also be used. Use of a monoenergetic beam may provide certain advantages because since all the photons have the same selected energy and can be tuned to optimize results. In one example, the beam energy is adjusted to be near the photofission thresholds of SNMs of 5.8-6.1 MeV. In another example, the beam energy could be higher than the photofission threshold to overlap the maximum in the photofission cross-sections at 14-15 MeV. If potential SNM is identified at the photofission threshold, then scanning can be repeated at the maximum photofission cross-sections. If SNM is indicated at both energy regions, then it is very likely that SNM is present. A further indication of the presence of SNM would be if there is no indication of SNM at energies below the photofission threshold, such as at 5.5 MeV, for example. It may be easier to adjust these energies with a monoenergetic beam than it would be with a Bremsstrahlung X-ray source. Monochromatic X-ray sources employing inverse Compton scattering of a laser beam from a high energy (MeV) accelerator are known in the art. (See, for example, Holder, D. J., et al., "COBALD—An Inverse Compton Back-Scattering Source at Darsebury," Proceedings of EPAC08, Genoa, Italy, MOPCO40, pages 160-162; Shimada, M., et al., "Inverse Compton Scattering of Coherent Synchrotron Radiation in an Energy Recovery LINAC," Physical Review Special Topics-Accelerators and Beams, 13, 100701 (2010). As used herein, the term "monochromatic" means that the value of the full width at half maximum of the beam divided by the nominal energy of the beam is no greater than 1%. Use of a monochromatic radiation source is not required.

A laser plasma accelerator may also be used as an inverse Compton scattering source to provide high energy electrons. Laser plasma accelerators have been used to create electron beams in excess of 1 GeV of kinetic energy, as described, for example, in Leemans, et al., "Laser guiding for GeV laser-plasma accelerators," Phil. Trans. R. Soc. A (2006) 364, pp. 585-600; and Leemans, et al., "GeV electron beam from a cm-scale accelerator," Lawrence Berkeley National Laboratory, May, 4, 2005, for example, which are incorporated by reference herein. Lower energy laser plasma accelerators are described in Malka, et al., "Medical Applications with Electron Beam Generated by Laser Plasma Accelerators," Proc. of SPIE Vol. 6881, 688110B-1-688110B-2 (2008); and Malka, et al., "Principles and applications of compact laser-plasma accelerators," nature physics Vol. 4, June 2008, pp. 447-453. To create photons that are in a range relevant to the detection of SNM in accordance with embodiments of the invention, electrons having kinetic energies in the range of from about 300 MeV to about 650 MeV may be made incident on a laser pulse of from about 1 to about 10 joules, for example. The photons in the laser pulse are upshifted in energy to be in the range of from about 5 MeV to about 16 MeV. The exact energy of the quasi-monochromatic beams are determined by the incident beam parameter for the electrons and the laser light.

Laser plasma accelerators are readily tunable to change the beam energy, enabling the full range of energies from SNM thresholds to maximum photofission peaks to be examined, such as from about 5 MeV to about 16 MeV, for example. The laser plasma accelerator system also has short bursts with beam pulses of from 10 femtoseconds to 50 femtoseconds.

In order to generate the plurality of nanosecond radiation pulses described above, the electron gun 104 is configured to inject very short, high voltage pulses of 10 nanoseconds or less in pulse duration, for example, and a few hundred or thousand volts. In the example of FIG. 2, the pulses are 0.25 microseconds apart. They may be from 0.10 to 0.30 microseconds apart, for example.

The electron gun 104 may be a gated electron gun, controlled by a modulated RF field on the grid or anode by modulating the grid voltage or the anode voltage, for example. A coaxial line-type pulser comprising high current hydrogen thyratrons and an auxiliary L-R-C circuit to increase pulse repetition frequency may be used, for example, as described in Koichi, et al. "Generation of High Intensity Beams of Nanosecond Pulse Duration by Electron LINACS," Japanese Journal of Applied Physics, Vol. 9, No. 11, November 1970, which is incorporated by reference herein. The use of a hard tube pulser comprising high-vacuum tubes, and a coaxial pulse-sharpening atmospheric gap, are also described. The pulser could also comprise MOSFETS or IGBTS, as in known in the art.

Grid modulation techniques currently used in electron guns driving inductive output tubes ("IOT"), where the voltage on the grid is modulated at a high rate, may also be appropriate to drive the electron gun 104 of the radiation source, as described in Zolfghari, et al. "Comparison of Klystron and Inductive Output Tubes (IOT) Vacuum-Electrode Devices for RF Amplifier Service in Free-Electron Laser," Proceedings of EPAC 2004, Lucerne, Switzerland, pp. 1093-1095; and Orrett, et al., "IOT Testing at the ERCP," Proceedings of EPAC 2006, Edinburgh, Scotland, pp. 1382-1384, which are incorporated by reference herein.

In another alternative, a laser pulse in a laser driven photocathode may be modulated to provide an electron gun train, as is known in the art. Another option is to chop a beam of electrons generated by a direct current (DC) gun, at a desired rate, as is also known in the art.

If a laser plasma accelerator is used, as described above, an electron gun is not needed because the plasma is the source of the electrons.

The target material 105 of the accelerator 102 may comprise tungsten, tantalum, beryllium, or other target materials known in the art. The target material 105 may also comprise deuterium in the form of lithium deuteride, for example.

Figure 4:
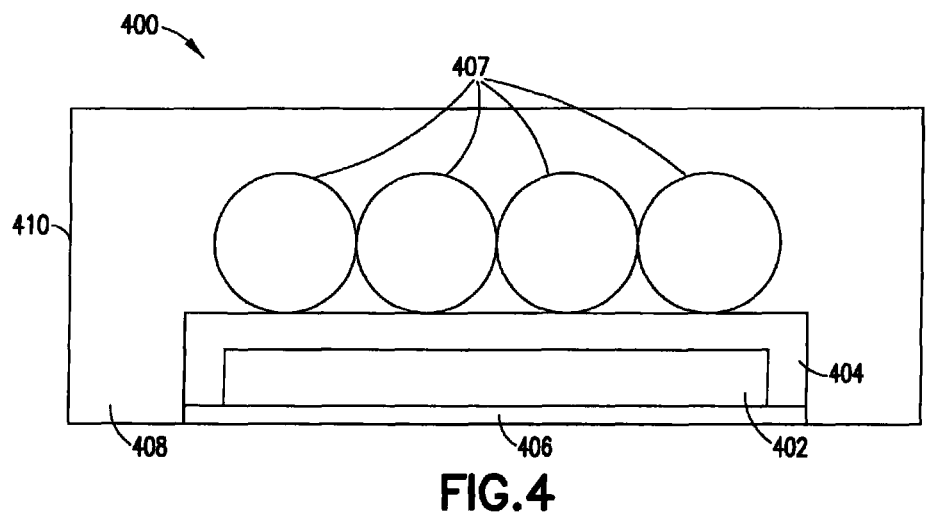
FIG. 4 is a schematic diagram of a combined gamma ray/neutron detector for use in the system of FIG. 1.

The gamma ray detector 112 may also be configured to detect neutrons. FIG. 4 is a schematic diagram of a combined gamma ray/neutron detector 400 for use in the system 10 of FIG. 1, in accordance with another embodiment of the invention, to detect gamma rays and neutrons, while blocking low energy neutrons, such as thermal neutrons, from detection. The detector 400 may be used as the detector 110 or in addition to the detector 110. The detector 400 applies the Cerenkov Effect, where radiation is emitted when a charged particle passes through a medium at a velocity exceeding the speed of light in that medium. The velocity of the particle ($\beta$) relative to the speed of light is $\beta=1/n \cos(\theta_c)$, where "n" is the index of refraction, which sets a limit on the detection capability of the detector. For most plastic scintillator materials, $\beta$ for electrons and positrons is greater than a few hundred KeV.

The combined detector 400 in accordance with this embodiment comprises a layer of a plastic scintillator 402, to detect the gamma rays. The plastic scintillator 402 may comprise polyvinyl toluene ($C_{10}H_{11}$) and organic fluors, such as BC 420, available from Saint-Gobain Crystals, Hiram, Ohio, for example. According to a specification provided by Saint-Gobain, BC 420 is said to have low self-absorption, a time constant of 1.5 ns, a light output (% Anthracene, where Anthracene light output is 40-50% of NaI(TL)) of 64, a wavelength of maximum emission of 391 nanometers, a decay constant (main component) of 1.5 ns, a bulk light attenuation length of 110 cm, a refractive index of 1.58, an H-C ratio of 1.102, a density of 1.032, and a softening point of 70° C. Saint-Gobain BC 408, BC 501 or BC 720 plastic scintillators could also be used, for example.

A light reflector 404 is provided around the plastic scintillator 402. The light reflector 402 collects light emitted from the scintillator and transports the collected light to photomultiplier tubes (not shown), as is known in the art. The light reflector may comprise poly (methyl methacrylate) ("PMMA"). The PMMA may include a wave shifter dopant, as is known in the art.

A thin metal converter 406 is in front of the plastic scintillator. A plurality of Helium-3 tubes 407 are positioned behind the plastic scintillator 402, to detect neutrons. In this example, four Helium-3 tubes are provided. More or fewer Helium-3 tubes 407 may be provided. The Helium-3 tubes 406 are surrounded by a hydrogenous material 408, such as polyethylene, to slow the fast neutrons so that they can be captured by the helium-3 tubes 407. The entire assembly is contained within cadmium shielding 410, which absorbs thermal reactors.

Neutrons are detected by the Helium-3 tubes 406, while photons are detected by the plastic scintillator 402, which also acts as a moderator to slow neutrons. This facilitates detection by the helium tubes 406.

The metal converter 406 converts photons with energies of greater than 1.02 MeV into $e^+e^-$ pairs that cross the plastic scintillator 402 and emit Cerenkov radiation. The Cerenkov radiation is detected by photomultiplier tubes or photodiodes (not shown). It also further reduces the passage of low energy background radiation. The converter 406 may comprise lead, tungsten, or tantalum, for example.

Most of the X-ray photons reflected from the cargo container 107 by X-ray radiation from the X-ray source 101 have energies below the Cerenkov threshold, due to absorption and large angle Compton scattering. Such X-ray photons will not, therefore, be detected. This reduces the detection of photons that are not of interest, facilitating the detection of prompt gamma rays from prompt fission events.

Analysis

The coincident detection of prompt gamma rays and prompt neutrons is indicative of the possible presence of SNM. The detection of delayed gamma rays and/or delayed neutrons provides further confirmation of the presence of SNM. As noted above, on average 6 to 7 prompt gamma ray photons and 2 to 3 prompt neutrons are emitted per photofission event, depending on the SNM. The detection of two or more prompt gamma rays and 6 to 7 prompt neutrons from the same region within the object, in between consecutive radiation micropulses, would therefore be highly indicative of the presence of SNM in that region. It is believed that SNM as small as about 100 cubic centimeters, which is about 19 kilograms of highly enriched uranium, or smaller, may be detected. If only delayed gamma rays and/or delayed neutrons are detected, or if the system is configured to only detect delayed gamma rays or delayed neutrons, then the presence of SNM is possible and further examination is required to increase the probability of detection.

The approximate location of a possible SNM may be determined in a variety of manners. For example, if the radiation beam is a fan beam or a cone beam, the emission of photofission by-products can be narrowed to within one or a few scanned slices or regions. The location can be further narrowed by reducing the height and/or width of the scanning core beam or fan beam, by the collimator 117. If the radiation beam is a pencil beam, the location of the possible SNM can be determined to be within smaller regions.

The approximate position of an SNM without a scanned region may also be further refined within the volume of the slice or region by TOF spectra, taking into consideration the detector resolution. The inherent time structure in the arrival times of prompt and/or delayed gamma rays, and/or prompt and/or delayed neutrons may enable the localization of the position of the SNM, by determining the depth of the SNM in the object, for example. The location in the other two dimensions may be determined from the spatial resolution of the detectors, as is known in the art. Localization would be advantageous in the inspection of cargo containers or other large objects since it facilitates the performance of additional tests or examinations of the suspect region or object, speeding the identification process.

For example, if the SNM 114 is at or near the center of the cargo container 107, and all the detectors 110 are at about the same distance from the center of the cargo container, then all the detectors will detect the prompt neutrons at about the same time. If, however, the SNM 114 is at a position within the cargo container 107 that is closer to one or the other detectors 110, that detector will detect the prompt and/or delayed neutrons and/or gamma rays before the others, enabling the approximate location of the SNM within the cargo container to be pinpointed. More detailed analysis of the detection times by the different detector arrays 110, including the gamma detector array 112, enables better determination of the location of the SNM. The approximate location of an SNM may also be determined based radiographic imaging, as well.

In another example, in a primary scan, an image is generated based on the spatial detector 109. The image may be a dual energy image of the cargo container 107 and a fused image may be generated based on images at each energy, for example. If suspect regions are identified on the image or fused image, subsequent secondary scans of the suspect area may be performed with X-ray beams of at least 9 MeV, for example. If the suspect regions comprise SNMs, photofission should be induced. When the X-ray beam is off, delayed neutron and delayed gamma signatures are detected, as discussed above. Since the size of the container 107 is known, the location of the walls can be determined from the first scan, the location of the SNM 114 may be determined. A maximum likelihood algorithm may be used to determine the localized three-dimensional object emitting the signatures, based on a comparison of the detection times and the decay groups, by the processor 116, for example. Since the expected decay groups of SNMs for delayed gamma rays and delayed neutrons are known, the identity of the SNM 114 may also be determined, based on the energy, time, and pulse shape of the detected neutrons and photons, as is known in the art. If prompt gamma rays and/or prompt neutrons are also detected, the data may be used to further confirm the type of material present.

It is noted that there will be some "smearing" of data due to the fact that not all delayed neutrons and delayed gamma rays are emitted at the same time. The sample also has a finite size. The precision of the location identification in the cargo conveyance may therefore be on the order of a few centimeters.

Further confirmation of the presence of SNM may be provided in dual energy systems by scanning a suspect region (a region where photofission by-products may have been detected) with radiation energy above the photofission threshold and radiation below the photofission threshold. The detection of photofission by-products at the energies above the threshold but not below the threshold would be highly indicative of the presence of SNM in the region.

If the radiation source 101 is a source of monochromatic radiation, as discussed above, then energies of slightly above and below the photofission threshold of 5 MeV to 7 MeV of a particular SNM may be used. Uranium-235, for example, has a photofission threshold between 5.7 and 5.8 MeV. Energies from about 250 KeV to 500 KeV or more above and below the threshold may be used, for example, such as high energy of from about 6 MeV to about 7 MeV, and a low energy of from about 4 MeV to about 5 MeV, For example, if the radiation source 101 generates Bremsstrahlung radiation, which is not monochromatic, then the scanning energies may be 500 KeV or more above and below the photofission threshold. The detected energy radiation source 101 maybe rapidly cycled between the high and low energies.

Another technique to increase the confidence that SNM is present after the detection of photofission by-products is to review spatial images of the suspect region based on radiation transmitted through the object and detected by the spatial detector 110. If a region of high density is found on the image, the likelihood that SNM is present is also increased. In addition, if no legitimate high density material is identified on the manifest, the presence of the high density region and photofission by-products is highly indicative of the presence of illegitimate SNM.

X-Ray/Neutron Scanning

In accordance with a second embodiment of the invention, the at least potential presence of explosives, drugs, and certain chemical and biological agents, as well as SNMs, may be determined. In this embodiment, neutron scanning is used along with X-ray scanning to determine the elemental content of the cargo container 107 or other such object. Since neutrons have a cross-section 7 to 8 times greater than photons, they are more likely to cause fission in an SNM 114 in the cargo container 107.

Figure 5:
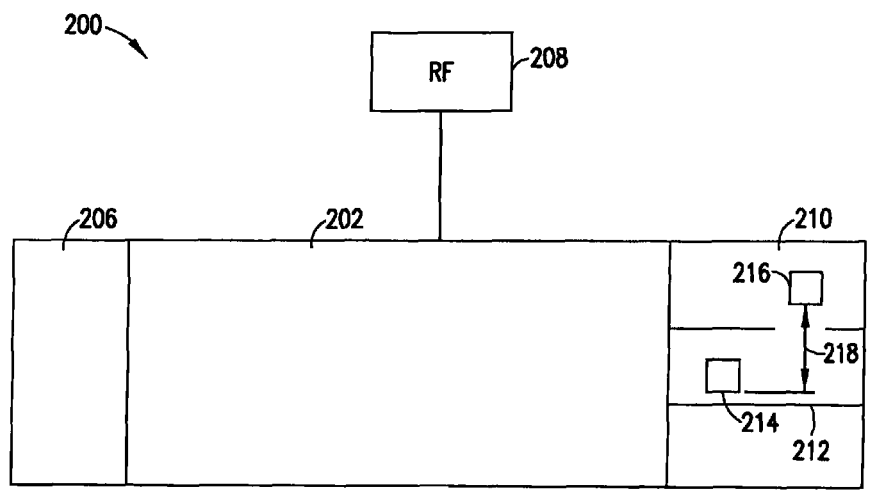
FIG. 5 is a schematic representation of neutron/X-ray source for use in a second embodiment of the invention.

FIG. 5 is a schematic representation of an example of a neutron/X-ray source 200 for use in this embodiment of the invention, comprising a linear accelerator 202. The linear accelerator 202 comprises an accelerating chamber 204 comprising a plurality of acceleration chambers (not shown), an electron gun 206, and an RF power supply 208, as in the radiation source 102. A headend 210 is shown including a drift tube 212 at the output of the acceleration chamber 202, to receive accelerated charged particles, such as electrons, exiting the accelerator. A first target 214 comprising tungsten, for example, is positioned within the drift tube 204. Impact of accelerated charged particle on the tungsten target 214 causes generation of Bremsstrahlung X-ray radiation, as is known in the art. The neutron/X-ray source 200 may replace the X-ray source 101 in FIG. 1, in the second embodiment. The linear accelerator 202 may be configured to accelerate electrons to two or more energies in an interlaced manner, as described in U.S. Pat. Nos. 8,198, 587 and 8,183,801, for example, which are assigned to the assignee of the present invention and are incorporated by reference herein. Multiple linear accelerators or X-ray sources may be used to generate the multiple X-ray energies, as well. The use of multiple linear accelerators is also discussed in U.S. Pat. No. 8,198,587.

In accordance with this embodiment, a second, neutron generating target 216 is provided in the headend 210, selectively positionable behind the first, tungsten target 214. The second target 216 may comprise beryllium (Be) or deuterium (D) for example, which generates neutrons from the impact of X-ray photons generated by the first target 216. Neutrons are generated by a gamma/neutron ($\gamma$, n) process. The second target 216 may be selectively moved behind the first target 214 by a mechanism, schematically represented by the arrow 218, such as a plunger or a rotating wheel (not shown) driven pneumatically by an air cylinder, for example. The plunger or rotating wheel may be driven electromagnetically, as well.

Alternatively, two separate targets may be provided in different locations. A first, X-ray generating target may comprise tungsten, for example, to generate X-ray radiation and the second, neutron generating target may comprise tungsten and beryllium, for example, to generate neutrons. The path of the accelerated electron beam may be directed toward one or the other target by a magnetic field, for example. Neutrons may also be induced by bombardment of lithium $(p, n)^7$ Li or boron $(d, n)$ $^{11}$B by protons or deuterons accelerated by a cyclotron or radio frequency quadrapole (RFQ) accelerator, for example, as is also known in the art.

In accordance with this embodiment, X-ray scanning is performed with the second target 216 in its first position away from the first target 214. The X-ray scanning with the first target 214 may be performed as described above with respect to the first embodiment to detect prompt and/or delayed gamma rays and neutrons, which are indicative of the presence of SNMs, and/or conventional X-ray scanning may be performed.

After sufficient data is collected, the second target 216 is moved into its second position behind the first target 214. A suitable time of flight spectrum to control the detectors as in the examples above may be developed, with longer time periods to detect photofission by-products resulting from the impact of neutrons on SNM or other materials, based on the distances between the radiation source 200, the cargo container 107, and the detectors 109, 110, 112. Some X-ray radiation may pass through the second target 216 without causing generation of neutrons, and scan the container 107. The TOF spectra may be adapted to ignore the results of the interaction of the X-ray radiation with the cargo container 107, during neutron scanning, or the X-ray data may also be used through detection by the spatial detector 109 to generate one or more images.

If the system is capable of dual or multi-energy X-ray scanning, such scanning may be performed to determine whether high atomic number material is at least potentially present, as described in U.S. Pat. Nos. 8,290,120, 8,263,938, 7,636,417, 7,423,273, and 7,257,188, which are assigned to the assignee of the present invention and are incorporated by reference herein. High atomic number material may be defined as material having an atomic number greater than a predetermined atomic number, as described in these patents.

Then neutron scanning may be performed at two or more radiation energies as well, after moving the second target 216 into its second position behind the first target 214. The neutrons resulting from the impact of the second target 216 will have different energy distributions due to the dual energy scanning. The neutron energy may range from the KeV to MeV range since low energy neutrons will have a lower velocity.

For example, when scanning with 9 MeV Bremsstrahlung radiation, neutrons will be generated having energies of from a few hundred keV to 6.9 MeV. When scanning with 6 MeV Bremsstrahlung radiation, the energy endpoint will be tens of keV to 3.9 MeV. To detect the neutrons across the range of energies, the electron gun may be gated off longer than described above, to provide more time to detect the neutrons. Low energy neutrons without enough energy to penetrate through the cargo container 107 may be filtered by a block of polyethylene, for example, between the radiation source 200 and the cargo container 107.

The X-ray image can provide information on elemental ranges of the components of the cargo container 107, while the neutron data can further clarify the elemental information through various mechanisms. The delayed neutrons and delayed gamma rays may be emitted by different isotopes of an SNM, from different induced fission events, enabling identification of the material. For example, neutron scanning can yield neutron elastic scattering data, which is indicative of the density and types of materials present. Neutron scanning can also cause inelastic scattering, resulting in excited nuclei. The excited nuclei decay, emitting a prompt gamma ray having a unique energy indicative of the emitting nuclei. Detection of the energy of the photons via the first detector 109, for example, can therefore be indicative of the contents of the cargo container. If carbon, nitrogen, and oxygen are found to be present, the ratio of these elements may be used to determine if explosive material is present, as is known in the art. U.S. Pat. No. 5,098,640 describes techniques for determining whether contraband is present based on three-dimensional images of hydrogen, carbon, nitrogen and oxygen within an object derived from gamma ray detection resulting from fast neutron scanning, for example.

The presence of chlorine, phosphorus, arsenic, and sulphur can also be determined based on detected gamma rays, as is also known in the art. Illegal drugs, such as cocaine and morphine, which are often transported in chlorinated forms, may be detected based on a gamma ray signature indicative of the presence of chlorine, for example, as is known in the art. The photons can be detected by an array of photon counting detectors, for example, such as the gamma ray detectors 112.

Since neutrons, both fast and slow, of sufficient energy can also induce fission in SNMs resulting in fission by-products, scanning by the X-ray/neutron source 200 can be used to detect the presence of SNMs by neutron scanning, as well as by X-ray scanning. Prompt and/or delayed gamma rays and neutrons may be detected based on TOF spectra, as discussed above with respect to X-ray scanning. The expected detection times may be determined in a similar manner as that discussed above. For example, prompt neutrons, detected based on TOF spectra, in a similar manner as described above, generated by the neutron probe beam in an SNM would cause an enhancement in the energy region above 3 MeV to 4 MeV, indicating that an SNM is at least potentially present and is creating neutrons at this energy. Localization of SNM and other contraband may also be provided, as described above. Neutron energies of above 6 MeV may be used, for example.

The ability to induce fission by scanning by both X-ray radiation and neutrons makes it difficult to avoid detection of SNMs by shielding. The presence of shielding that can prevent transmission of either or both of X-rays and neutrons would itself be identified as a suspect, high density region based on transmission images or data collected by the spatial detector 109 and analyzed in accordance with the teaching of U.S. Pat. Nos. 8,290,120, 8,263,938, 7,636,417, and 7,257,188, for example, which are assigned to the assignee of the present invention and are incorporated by reference herein. Such an identification may prompt further examination in accordance with embodiments of the invention.

While discussed above with respect to moving an object through a radiation beam generated by the radiation source, embodiments of the application are equally applicable to a system in which the radiation source is moved horizontally or vertically with respect to a stationary object. The object may also be moved vertically and/or rotated with respect to a stationary or movable source.

One of ordinary skill in the art will recognize that other changes may be made to the embodiments described herein without departing from the spirit and scope of the invention, which is defined by the following claims.

We claim:

1. A method of examining contents of an object, the method comprising:
   injecting a plurality of radiofrequency power pulses into an accelerator, the plurality of radiofrequency power pulses being separated by first gaps;
   injecting a plurality of charged particle pulses into the accelerator while each of the plurality of radiofrequency pulses are injected into the accelerator, the plurality of charged particle pulses being separated by second gaps smaller than the first gaps;
   impacting a target material by each of the plurality of accelerated charged particles to generate macropulses of radiation corresponding to each radiofrequency pulse, each macropulse being separated by the first gaps and containing a plurality of micropulses of radiation corresponding to the plurality of charged particles injected into the accelerator during each radiofrequency power pulse;
   scanning an object by the plurality of consecutive macropulses of radiation comprising the respective pluralities of consecutive micropulses of radiation;
   checking for prompt gamma rays detected in respective first time periods in respective second gaps between respective consecutive micropulses of radiation and not during any of the respective consecutive micropulses, the respective first time periods being based, at least in part, on respective expected arrival times of prompt gamma rays at a first detector resulting from photofission within the object, if any, induced by a respective consecutive micropulse;
   checking for prompt neutrons detected in respective second time periods in respective second gaps between respective consecutive micropulses of radiation and not during any of the respective consecutive micropulses, the respective second time periods being based, at least in part, on respective expected arrival times of prompt neutrons at a second detector resulting from photofission within the object, if any, induced by a respective consecutive micropulse;
   checking for delayed gamma rays detected in respective third time periods in respective first gaps between respective consecutive macropulses of radiation and not during either of the respective consecutive macropulses, the respective third time periods being based, at least in part, on respective expected arrival times of delayed gamma rays at the first detector resulting from photofission within the object, if any, induced by a respective consecutive macropulse;
   checking for delayed neutrons detected in respective fourth time periods in respective first gaps between respective consecutive macropulses of radiation and not during any of the respective consecutive macropulses, the respective fourth time periods being based, at least in part, on respective expected arrival times of delayed neutrons at the second detector resulting from photofission within the object, if any, induced by the respective consecutive macropulse; and
   determining whether the object at least potentially contains Special Nuclear Material based, at least in part, on the checks for the detection of the prompt gamma rays, prompt neutrons, delayed gamma rays, and/or delayed neutrons.

2. The method of claim 1, wherein:
   the charged particle pulses are separated by from about 100 nanoseconds to about 300 nanoseconds; and
   the charged particle pulses are from about 0.5 nanoseconds to about 10 nanoseconds long.

3. The method of claim 1, wherein:
   the first detector is a first distance from the object;
   the second detector is a second distance from the object;
   a source of the first and second radiation pulses is a third distance from the object;
   the first expected arrival time is based, at least in part, on the first and third distances; and
   the second expected arrival time is based, at least in part, on the second and third distances.

4. The method of claim 1, wherein the micropulses and macropulses of radiation comprise X-ray radiation.

5. The method of claim 4, further comprising:
   scanning the object by consecutive neutrons pulses;
   checking for the detection of prompt and/or delayed gamma rays resulting from scanning by the neutron pulses;
   checking for the detection of prompt and/or delayed neutrons resulting from scanning by the neutron pulses; and
   further determining whether the object at least potentially contains explosives, drugs, chemical agents, and/or biological agents based, at least in part, on the check for the detection of the gamma rays and the check for the detection of neutrons resulting from the scanning by the consecutive neutron pulses.

6. The method of claim 5, further comprising:
   determining an identity of contents of the object based, at least in part, on the check for the detection of gamma rays and the check for the detection of neutrons resulting from scanning by the neutron pulses.

7. The method of claim 1, further comprising:
   detecting consecutive radiation pulses transmitted through the object;
   generating a transmission image based on detected consecutive radiation pulses; and
   determining whether the object at least potentially comprises Special Nuclear Material based, at least in part, on the spatial image.

8. The method of claim 1, further comprising:
   determining a location of the at least potential Special Nuclear Material in the object based, at least in part, on respective detection times for the prompt gamma rays, prompt neutrons, delayed gamma rays, and/or delayed neutrons at the first and second detectors.

9. The method of claim 1, comprising:
   determining, by a processor, that the object at least potentially contains Special Nuclear Material if both prompt gamma rays and prompt neutrons are detected; and
   confirming, by the processor, that the object contains Special Nuclear Material if at least one of delayed gamma rays and delayed neutrons are detected.

10. The method of claim 1, comprising detecting prompt gamma rays, prompt neutrons, delayed gamma rays, delayed neutrons by the same detector.

11. The method of claim 1, wherein the delayed gamma rays and the delayed neutrons are produced microseconds to hundreds of milliseconds after emission of the prompt gamma rays and the prompt neutrons.

12. The method of claim 11, wherein the prompt gamma rays and the prompt neutrons are produced on the order of $10^{-15}$-$10^{-12}$ seconds after photofission.

13. The method of claim 1, wherein the prompt gamma rays and the prompt neutrons are produced on the order of $10^{-15}$-$10^{-12}$ seconds after photofission.

14. The method of claim 1, comprising scanning the object by a pattern of macropulses comprising micropulses.

15. The method of claim 1, further comprising, after scanning:
   detecting at least one of prompt gamma rays, prompt neutrons, delayed gamma rays, and delayed neutrons.

16. The method of claim 15, comprising:
   checking for the detection of prompt gamma rays and delayed gamma rays by at least one first detector positioned to detect prompt gamma rays and delayed gamma rays; and
   checking for the detection of prompt neutrons and delayed neutrons by at least one second detector positioned to detect prompt neutrons and delayed neutrons; and
   the method further comprising:
   gating the at least one first detector to a high gain during the first time periods to detect the prompt gamma rays;
   gating the at least one second detector to a high gain during the second time periods to detect the prompt neutrons;
   gating the at least one first detector to a high gain during the third time periods to detect the delayed gamma rays; and
   gating the at least one second detector to a high gain during the fourth time periods to detect the delayed neutrons.

17. The method of claim 16, wherein the at least one first detector and the at least one second detector are the same.

* * * * *